Oct. 23, 1956 — M. C. HULING — 2,767,818
SAFETY DEVICE
Filed Dec. 4, 1953 — 2 Sheets-Sheet 1

INVENTOR:
Max C. Huling
By Herbert E. Metcalf
His Patent Attorney

Oct. 23, 1956    M. C. HULING    2,767,818
SAFETY DEVICE
Filed Dec. 4, 1953    2 Sheets-Sheet 2
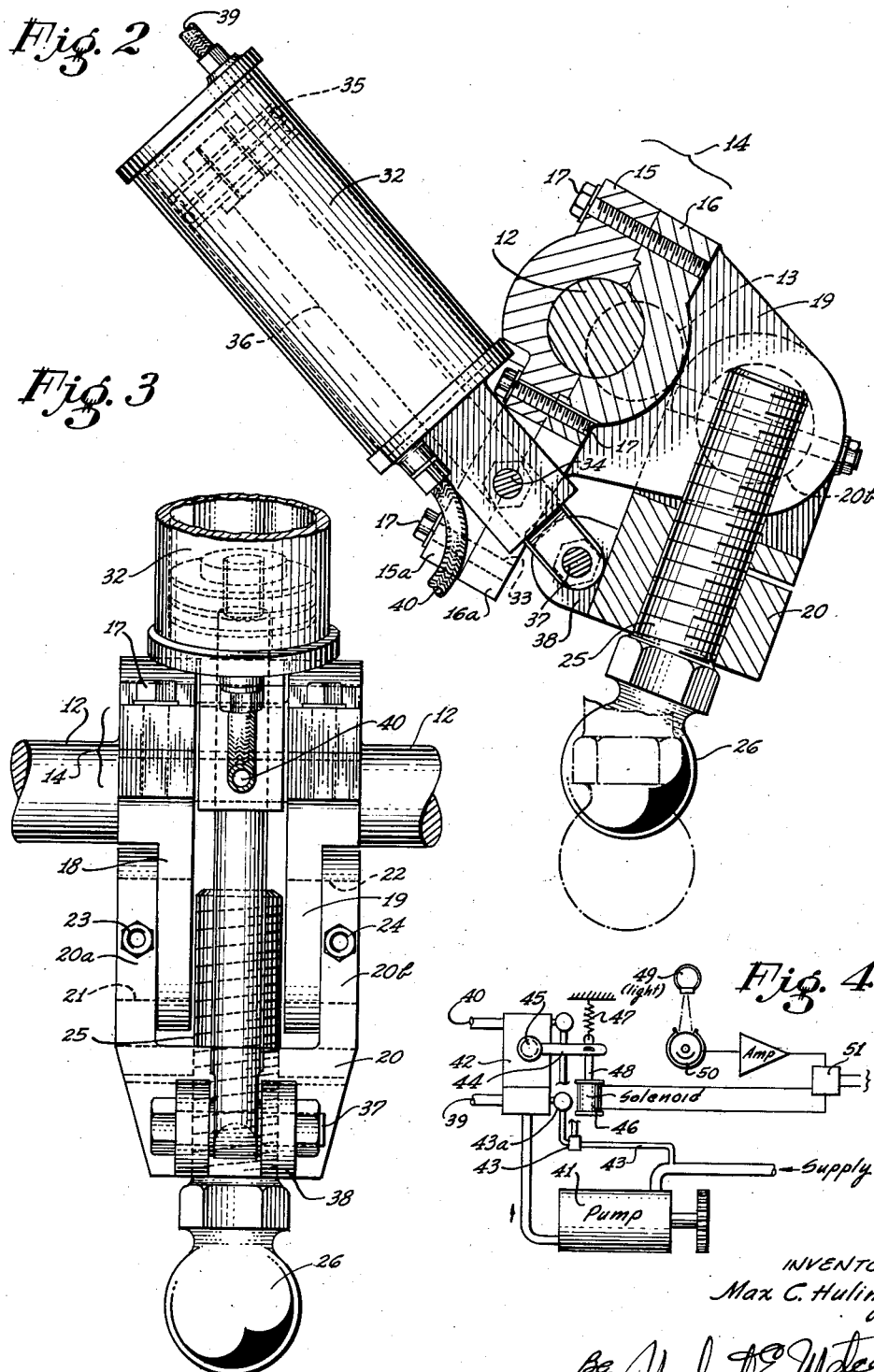
INVENTOR:
Max C. Huling
By Herbert E. Metcalf
His Patent Attorney

United States Patent Office 2,767,818
Patented Oct. 23, 1956

2,767,818

SAFETY DEVICE

Max C. Huling, Hermosa Beach, Calif., assignor to Northrop Aircraft, Inc., Hawthorne, Calif., a corporation of California Application December 4, 1953, Serial No. 396,269

6 Claims. (Cl. 192—129)

This invention relates to a safety fitting for power operated machines having reciprocated parts, such as metal stamping presses, of the type in which a reciprocating motion of a movable member with respect to a fixed member is effected by means of a crank having a heavy pitman or plunger member mounted on the crank transmitting the rotary movement thereof as a reciprocating movement to a member guided for straight line movement on the frame of the machine to which member guided for straight line movement the movable member is secured.

Presses of the type described are in wide use and it is the general object of this invention to provide an electrically triggered safety device which may be incorporated in, or built into, such presses with little modification of the standard parts thereof.

Accidents to personnel working stamping presses of all types are quite common in spite of the use of safety devices of various kinds, and even if the operator is fully proteced, damage to the work may occur due to the presence of a tool or the like inadvertently left in the working space of the press.

Presses of the kind referred to are usually provided with a heavy flywheel mounted on the crankshaft in order to utilize the rotational momentum of the flywheel to deliver a forceful blow of the movable member which operates a movable die against the stationary die member mounted on the bed of the press. Consequently as the movable die member moves toward the fixed die member, if its movement is to be suddenly arrested, the means for doing so must be very rapid in action.

Further, since the movable die member together with the breech block on which it is mounted is of very considerable weight, the safety means must be of strong construction in order to absorb the shock caused by sudden arrest of its movement.

It is the general object of the invention to provide a safety device involving little modification of certain parts of machines to which it is applicable such as a press and which will prevent the moving member from being brought into engagement with the fixed member should any object be brought into the working space of the press or other machine.

It is a particular object of the invenion to provide a safety fitting to arrest movement of the movable die member of a press which is rapid and positive in action.

It is another object of the invention to provide means for the purpose described which are of simple and rugged construcion well suited to the heavy stress to which they are subjected.

In presses and other machines of the type to which this invention is applicable, it is possible through improper seup of the work to subject the machine, dies, or both to excessive stresses, and it is further object of the invention to provide safety means so arranged that, in addition to preventing the movable member of the die from making a full movement toward the fixed member in the event that an object is positioned inadvertently in the working space of the press, they will also function to prevent the press from being subjected to excessive stresses.

A further object of the invention is to provide a safety device which is normally held out of operation by an electrical circuit and electrical elements comprised in said circuit, which is so arranged that in the event of interruption of said circuit from any cause, the safety device would be brought into operation instantaneously.

Still further objects and features of the invention will hereinafter appear from the following specification read with reference to the accompanying drawings which illustrate a preferred embodiment of the invention.

In the drawings:

Figure 2 is a detail view in side elevation of parts shown in Figure 1, but in the position assumed when the safety device has been operated;

Figure 3 is a cross section on the line 3—3 in Figure 1; and

Figure 4 is a diagram showing electrical and pneumatic or hydraulic elements comprised in the control of the safety device of the invention.

Figure 1:
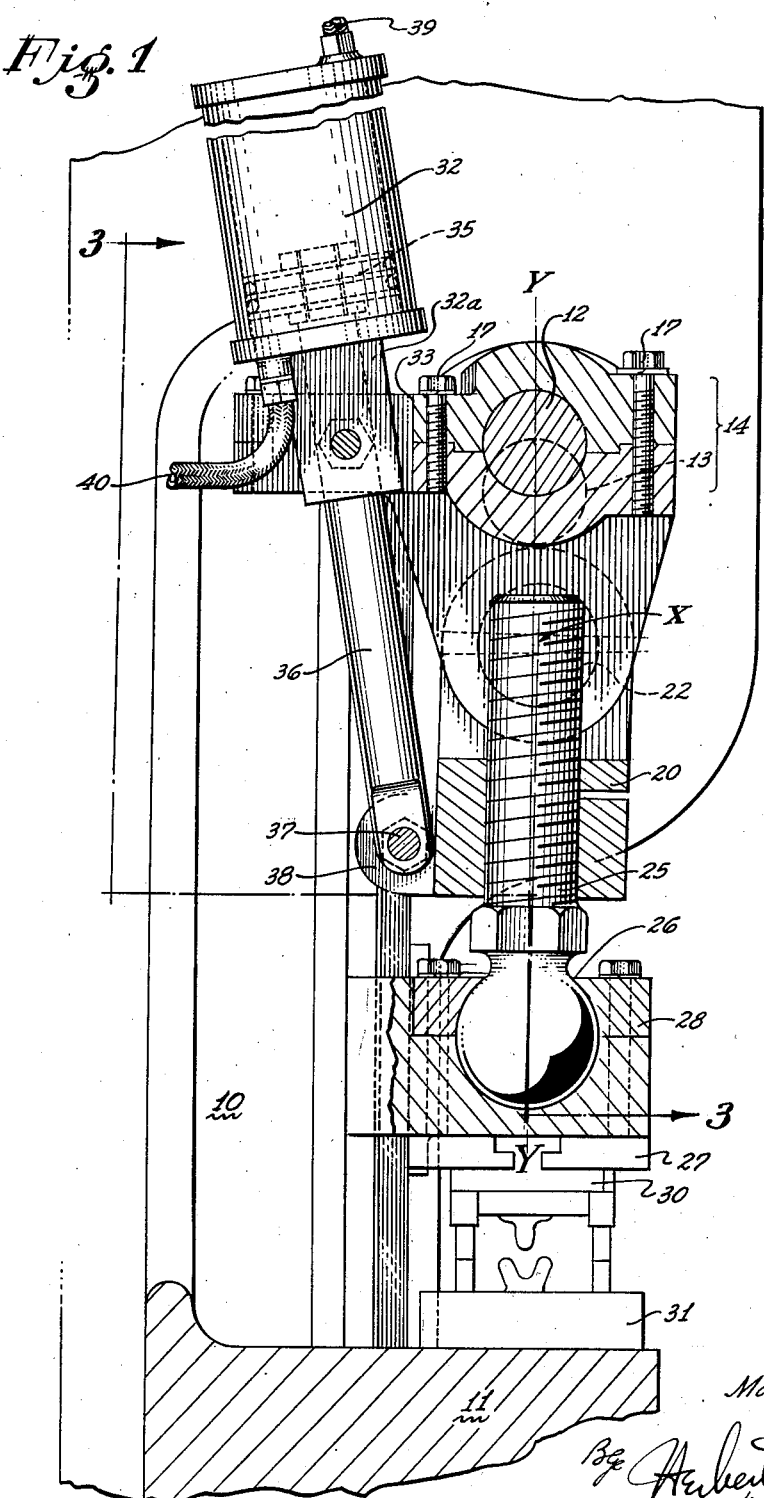
Figure 1 is a fragmentary side elevation with parts in section of the head portion of a press showing the parts of the safety device during normal functioning of the press.

In Figure 1 of the drawings the numeral 10 indicates a side member of the frame of the press, the bed of which is shown a 11.

A power shaft 12 is mounted transversely across the head of the press and is rotated by an electric motor, not shown.

Shaft 12 is formed with a crank 13, and in a representative form of press a sleeve is mounted for vertical reciprocating movement on the crank, but when modified according to this invention, an assembly 14 consisting of a body member comprising an upper member 15 and lower member 16 is mounted on the crank 13. The members 15 and 16 are formed with rearwardly extending arms 15a, 16a, the upper and lower members being bolted together by cap screws 17. The lower member 16 is provided with downwardly extending spaced apart lugs 18, 19.

A yoke 20 with upstanding arms 20a, 20b is pivoted to the lugs 18, 19, by heavy pivot pins 21, 22 secured in place by threaded pins 23, 24.

Yoke 20 is furnished with a vertical threaded bore in which a heavy adjustable screw 25 is mounted and constitutes the main thrust applying member of the press. The lower end of screw 25 is formed with a ball 26 releasably connected to a slide member 27 by a two part socket 28 in slide 27. The parts of the socket 28 are held together by bolts 29. Slide member 27 is guided for vertical reciprocating action by gibs (not shown) mounted on the side frames of the press. The movable member 30 of the die is secured to the lower face of the slide member 27 while the fixed member of the die is mounted on a bolster 31 mounted on the bed of the frame of the press.

Parts numbered 25 through 31, as well as the frame of the press and the crankshaft 12 with the means for driving it, may be of standard construction and will not be further described since they do not form part of the invention.

According to the invention, safety means are provided for normally holding the body member 14 and yoke 20 in line so that vertical movement is transmitted to the slide 27, but on any obstruction being accidentally placed in the path of movement of the movable member of the die toward the fixed member of the die, the safety means referred to are automatically operated to break the straight line relation of the body member 14 and yoke 20 so that the downward movement of the crank 13 has negligible effect in causing downward movement of the yoke.

The safety means comprise a cylinder 32 having an extension 32a pivotally mounted in a slot 33 cut in arms 15a, 16a, by trunnions 34 supported in holes drilled in the walls of the slot 33.

A double acting piston 35 is arranged in the cylinder mounted on a piston rod 36 passing through the cylinder extension and pivotally secured at its lower end by a pin 37 passing through lugs 38 extending rearwardly from body 20. It will be understood that pressure sealing means (not shown) of any suitable arrangement are positioned in cylinder extension 33a around the piston rod 36. Pressure fluid may be delivered into cylinder 32 above piston by pipe 39 and to below the piston by pipe 40.

The piston 36 when held at the lower end of cylinder 32 will hold the body member 14 and yoke 20 in line but preferably with the pivotal axis 22a of yoke 20 slightly over center with respect to the line between the axis of the crankshaft and the center of ball end 26 so that downward pressure exerted by the crank below a predetermined value is insufficient to break the relatively straight line relation of the parts because of the counter force exerted by the piston 35, if however the pressure exceeds the predetermined amount, the piston will be forced upwardly sufficiently to allow the joint to yield. If the pressure fluid utilized is compressed air no other mechanical elements than those described are required, but if hydraulic liquid is used a yielding load on the system would be required as for instance a spring loaded chamber connected to the fluid line. When pressure fluid is admitted below piston 35 the piston rod 36 will draw the lugs 38 of the yoke 20 toward the arms 16a of the body and fold the parts to approximately right angle relation to one another into the position shown in Figure 2. It will be noted that the assembly 14 has been rotated downward in counter-clockwise direction about the crank 13 while yoke 20, because of the pivoted connection of the arms 20a, 20b of the yoke to the depending lugs 18, 19 of the body member of the assembly 14 has been raised and will not be lowered beyond its normally raised position by the rotation of crank 13.

A suitable arrangement of elements to effect functioning of the safety device as described is shown in Figure 4 in which a pump 41 driven by the motor of the press supplies pressure fluid through control valve 42 to cylinder 32, to the space above piston 35 through pipe 39 and to space below the piston through pipe 40. Since in normal operation of the pump the piston is in lowered position, a return pipe 43 is provided from the end of the valve housing in communication with the upper end of the cylinder 32 to the intake of the pump, through a loading valve 43a provided to maintain the pressure above piston 35 to a value sufficient to assure that the parts of assembly 14 are maintained in a straight line. Similarly a return pipe is provided from the end of the valve housing in communication with the lower end of the cylinder to the intake of the pump; the pipe also being controlled by a loaded valve.

It will be understood that any suitable arrangement for delivering pressure fluid selectively to below or above the piston and relieving the back pressure against which the pressure fluid operates, may be made.

An arm 44 is connected to the shaft 45 of a valve member (not shown) of any suitable arrangement, directing the flow of pressure fluid through valve 42 to the upper or lower end of the cylinder 32, and the arm 44 is held by solenoid 46, the core 48 of which is connected to arm 44 to direct pressure fluid to the upper end of the cylinder while the solenoid is energized. In order to move the arm 44 in a direction to put the pressure fluid in communication with the lower end of the cylinder through pipe 40, a spring 47 is arranged to move the arm in the direction opposite to the pull of core 48 when the solenoid is de-energized.

The solenoid is controlled by signals put out by a photo cell and light circuit arrangement as indicated in Figure 4, a light being shown at 49 and a photo cell at 50.

A fluctuation of the current from the photo cell due to interruption of the light beam from light 49 falling normally on photo cell 50 or the failure of any electrical components operates a switch in switch box 51 which interrupts current to solenoid 47 and thereby causes actuation of the safety device, which operates with great speed since the operating fluid is under constant pressure. It will be understood that a plurality of lights and photo cells could be arranged so that no object, such as the hand of an operator, could be introduced into the working space of the press without interrupting a light beam and thereby operating the safety device.

The arrangement of the safety means so as to function also as a pressure limiting means is indicated in Figure 1 in which it will be noted that the axis x of pivot pin 22 is positioned slightly to the right of the line y—y passing through the center of the crankshaft 12 and of ball end 26 of screw 25. It will be evident that the thrust of the body assembly 14 will tend to force the point x to move further to the right but this force is resisted by the downward force exerted on piston 35 and transmitted to yoke 20 by pitman 36.

When the force exerted by the assembly 14 approaches a predetermined maximum the angle between the axis of the screw 25 and axis y—y will reach a magnitude preventing the predetermined value of pressure to be exceeded, but the parts will resume their initial relation as soon as downward pressure is relieved.

Various additional features may obviously be incorporated with the safety release device of my invention, for instance an auxiliary pressure vessel can be arranged to be connected to the valve 42 controlling flow of fluid to the actuating cylinder 32 through a switch controlled by pressure in said valve exerted by the normal supply of pressure fluid, loss of this pressure would actuate the pressure operated switch which through suitable electrically operated elements would place the auxiliary pressure fluid in communication with valve together with further switch means to ensure interruption of the electrical circuits after the operation of such auxiliary pressure means have rendered the press or other machine inoperative until repairs have been effected.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A safety fitting for power operated presses having a crank reciprocating a movable die member into operating relation against a fixed die member, comprising: a first member mounted on the crank and having downwardly depending lugs; a second member having a body portion with spaced apart arms pivotally connected to said depending lugs; a nonresilient telescopic member having one portion pivotally secured to said first member and a second portion pivotally secured to said second member; and fluid pressure means effective to hold said telescopic member in extended position during normal operation of the machine to thereby hold said first and second members in alignment, and to effect telescoping of said members to fold said first and second members toward one another to approximately a right angle at times to prevent the movable die member from being brought into operative relation to said fixed die member.

2. A safety fitting for power operated machines as set forth in claim 1 and in which the pivotal connection of said first and second members is offset from a straight line joining the axis of said crankshaft and the pivotal connection of the second member to the movable member.

3. A safety fitting for power operated machines having a crank shaft and crank reciprocating a movable member into operative relation against a fixed member, comprising: a first member pivotally mounted on the crank; a second member pivotally connected to the first member, said second member being pivotally connected to the movable member; a cylinder pivotally mounted on the first member, a double acting piston working in said cylinder; a piston rod pivotally connected at its outer end to the second member; a source of fluid under pressure; a pipe connecting said source to a valve; pipes connecting said valve selectively to the upper or lower ends of the interior of said cylinder; means biasing said valve to direct fluid under pressure to the upper end of said cylinder space during normal operation of the press; and means operable to adjust said valve at times to direct pressure fluid into the lower end of the interior of the cylinder to effect folding of said first and second members toward one another.

4. A safety fitting as set forth in claim 3 and in which said means biasing said valve comprise: a yieldable member urging said valve to position for delivering pressure fluid to the lower end of said cylinder interior at times; a solenoid connected to said valve and effective while energized to hold the valve, against the resistance of said yieldable member, to deliver pressure fluid to the upper end of said cylinder interior during normal operation of the press; a switch controlling a supply of electric power; and a photo cell circuit operative when the light directed onto a photo cell is interrupted, to operate said switch to interrupt electric power to said solenoid to de-energize it.

5. A safety fitting for power operated machines having a crank shaft and crank reciprocating a movable member into operative relation against a fixed member, comprising: a first member pivotally mounted on the crank; a second member pivotally connected to the first member, said second member being pivotally connected to the movable member; a cylinder pivotally mounted on the first member, a double acting piston working in said cylinder; a piston rod pivotally connected at its outer end to the second member; a pump continuously operated by the power means operating the machine; a pipe connecting said pump to a valve; pipes connecting said valve selectively to the upper or lower ends of the interior of said cylinder; means biasing said valve to direct fluid under pressure to the upper end of said cylinder space during normal operation of the press; means operable to adjust said valve at times to direct pressure fluid into the lower end of the interior of the cylinder to effect folding of said first and second members toward one another; a return pipe from the lower and the upper end of the cylinder interior to the pump intake; and a pressure release valve controlling said return pipe.

6. A safety fitting for power operated machines having a crank shaft and crank reciprocating a movable member into operative relation against a fixed member, comprising: a first member pivotally mounted on the crank; a second member pivotally connected to the first member, said second member being pivotally connected to the movable member; a cylinder pivotally mounted on the first member, a double acting piston working in said cylinder; a piston rod pivotally connected at its outer end to the second member; a pump continuously operated by the power means operating the machine; a pipe connecting said pump to a valve; pipes connecting said valve selectively to the upper or lower ends of the interior of said cylinder; means biasing said valve to direct fluid under pressure to the upper end of said cylinder space during normal operation of the press; means operable to adjust said valve at times to direct pressure fluid into the lower end of the interior of the cylinder to effect folding of said first and second members toward one another; a return pipe from the lower and the upper end of the cylinder interior to the pump intake; and pressure relief valve means controlling said return pipes.

References Cited in the file of this patent

UNITED STATES PATENTS

| | | |
|---|---|---|
| 1,121,886 | Wittlinger | Dec. 22, 1914 |
| 1,222,695 | Taylor | Apr. 17, 1917 |
| 1,349,033 | Zeh | Aug. 10, 1920 |
| 2,058,668 | Davis | Oct. 27, 1936 |
| 2,494,847 | Welch | Jan. 17, 1950 |

FOREIGN PATENTS

| | | |
|---|---|---|
| 524,680 | Germany | May 11, 1931 |